H. ROHRDANTZ.
VEHICLE SIGNAL.
APPLICATION FILED AUG. 10, 1916.
1,273,672.
Patented July 23, 1918.
2 SHEETS—SHEET 1.
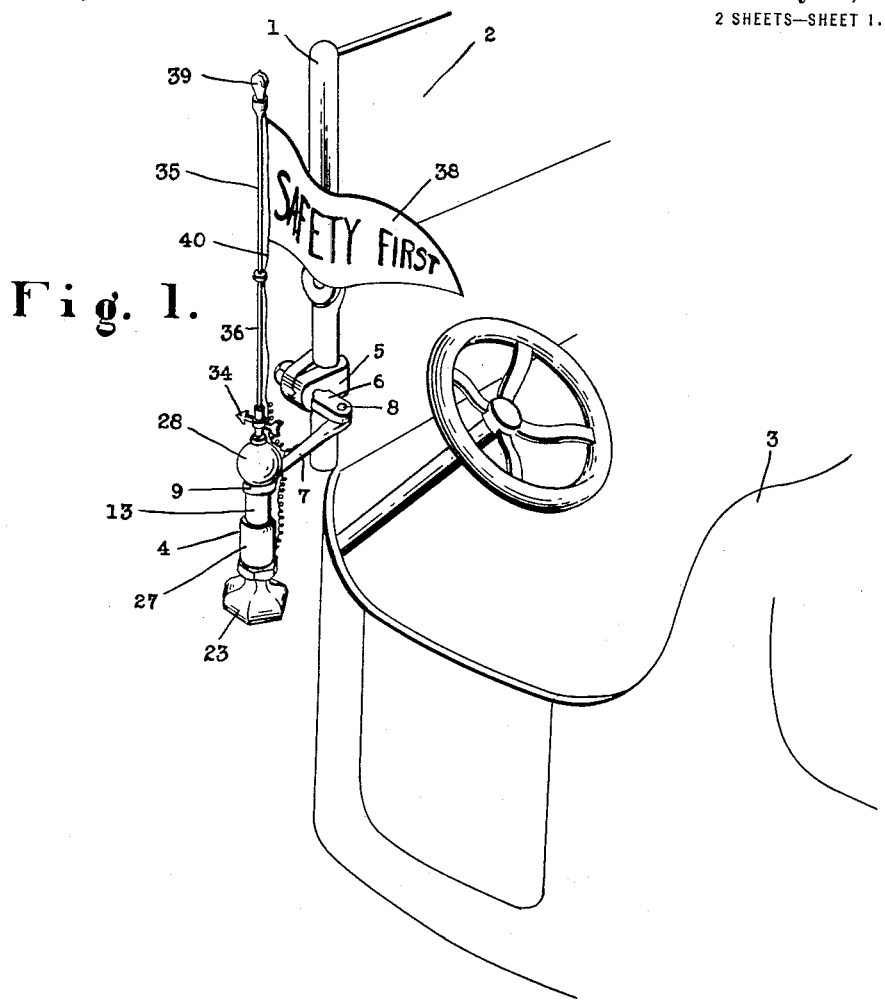
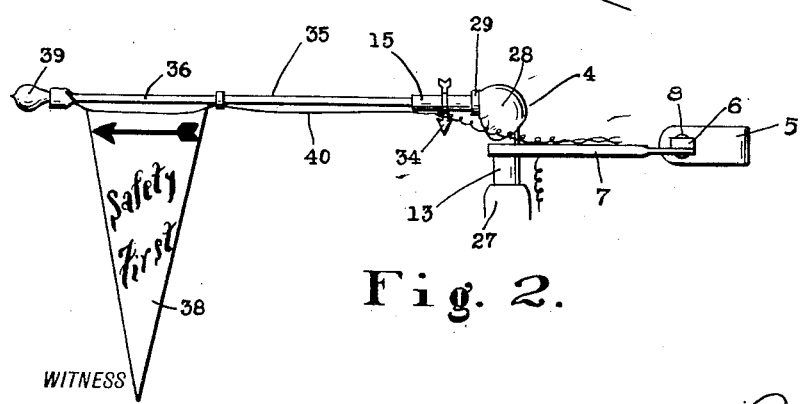
WITNESS
Howard P. King.
INVENTOR:
Henry Rohrdantz,
BY
Russell M. Everett,
ATTORNEY.

H. ROHRDANTZ.
VEHICLE SIGNAL.
APPLICATION FILED AUG. 10, 1916.
1,273,672.
Patented July 23, 1918.
2 SHEETS—SHEET 2.
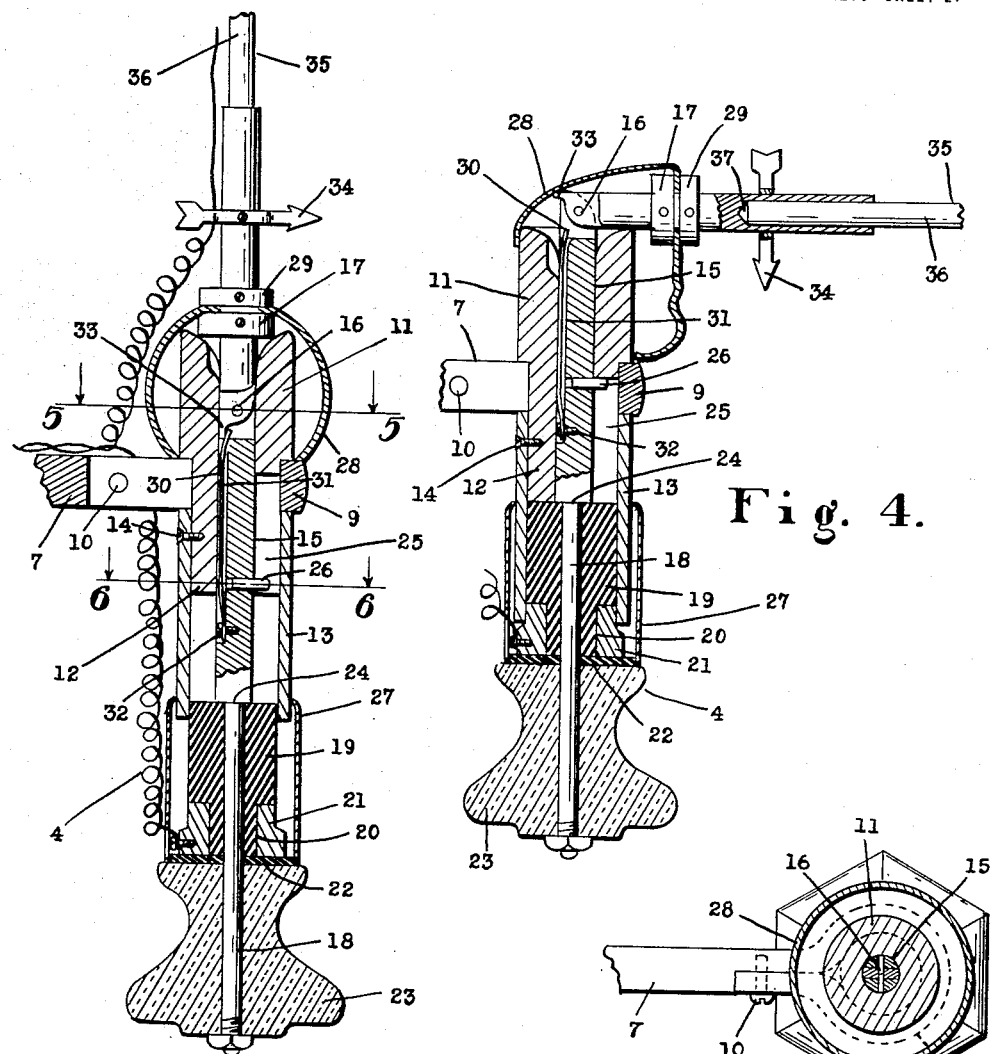
Fig. 3.
Fig. 4.
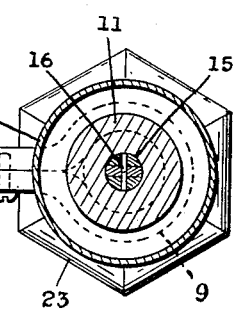
Fig. 5.
Fig. 6.
WITNESS
Howard P. King.
INVENTOR:
Henry Rohrdantz,
BY Russell M. Everett,
ATTORNEY.

UNITED STATES PATENT OFFICE.

HENRY ROHRDANTZ, OF WEST ORANGE, NEW JERSEY, ASSIGNOR TO UNIT SIGNAL CO., OF PLAINFIELD, NEW JERSEY, A CORPORATION OF NEW JERSEY.

VEHICLE-SIGNAL.

1,273,672.     Specification of Letters Patent.     Patented July 23, 1918.

Application filed August 10, 1916. Serial No. 114,121.

*To all whom it may concern:*

Be it known that I, HENRY ROHRDANTZ, a citizen of the United States, and a resident of West Orange, in the county of Essex and State of New Jersey, have invented certain new and useful Improvements in Vehicle-Signals, of which the following is a specification.

This invention relates more particularly to that class of vehicle signals to be used on automobiles for indicating the intentions of the driver as to whether he is going to turn, stop or the like, and the objects of the invention are to provide such a signal which will clearly indicate the driver's intention for whatever operation he wishes to perform; to readily manipulate the signal so as to require minimum attention and exertion by the driver; to provide a signal device visible at both the front and rear of the vehicle; to provide a construction adapted to be readily attached to a vehicle; to protect the parts from dust and rain; to secure simplicity of construction and operation, and to obtain other advantages and results as may be brought out in the following description.

Referring to the accompanying drawings, in which like numerals of reference indicate the same parts throughout the several views, Figure 1 is a perspective view of my improved vehicle signal attached to the windshield of an automobile;

Fig. 2 is an elevation of the signal showing the signal arm swung crosswise;

Fig. 3 is a vertical longitudinal section through the same with the signal arm upright;

Fig. 4 is a similar view with the arm swung crosswise;

Fig. 5 is a transverse cross-section on line 5, 5, Fig. 3, and

Fig. 6 is a transverse cross-section on line 6, 6, Fig. 3.

In the specific embodiment of the invention illustrated in said drawings, the reference numeral 1 indicates a side post of a windshield 2 attached to an automobile 3, said post 1 being shown for illustrative purposes as carrying my improved signal 4. To this end a clamp 5 is bolted to the post 2, the bolt 6 therefor having an arm 7 pivoted thereto at one end as at 8 so the arm may swing in a horizontal plane. The free end of the arm 7 is bent around to form a loop, as at 9, in a horizontal plane with the returned end secured to the shank portion of the arm by a screw 10 (see Fig. 5). A rotatable body member is carried in said loop, and preferably provides a head 11 above said loop and a reduced neck 12 depending through said loop and below the same with a sleeve 13 secured as by a screw 14 to the protruding portion of said neck below the loop preventing withdrawal of the neck. By this means, it will be seen that the body member is mounted so as to be rotated but held against longitudinal or sliding movement. Preferably the loop is arranged to be clamped by the screw 10 more or less tight about the neck 12 so as to obtain frictional contact therebetween and hold the body member at whatever position it is turned to. As shown, the body member is preferably cylindrical and the sleeve extends below the lower end of the neck a considerable distance for purposes which will hereinafter appear.

The body member is furthermore centrally and longitudinally recessed to slidably receive a knuckle member 15 which is preferably a rod formed in two sections hinged at their meeting ends, as at 16. The upper section forms a signal arm, and when the lower section is slid forward in the body member far enough to project the joint 16, said signal arm can tilt or tip over to indicate direction, while when the lower section is drawn downward the signal arm is returned into alinement with the lower section and the joint then retracted into the body member to hold the sections in such alinement. A collar 17 above the head 11 is fixed to the upper section of the rod 15 by means of which the rod is limited in downward movement through the body member. At a sufficient distance below the bottom end of the neck to permit the necessary upward movement of the rod, the lower section of said rod is reduced, as at 18, and receives a cylindrical insulating block 19 adapted to slidably enter the sleeve. The lower end of the insulating block is externally reduced, as at 20, and receives a ring 21 therearound which is adapted to engage the lower end of the sleeve and form an electrical contact therewith when the rod and its attached parts are raised to the upper end of their movement. Below the ring and the end of the block 19 is an insulating washer 22 overlying the upper end of a knob or handle 23 through which the said reduced portion 18 of the rod extends. A nut screws on the end of said reduced portion 18 of the rod below the knob and clamps the knob, washer, ring and insulating block all in position against the shoulder 24 formed by the reduction in diameter of the rod. The neck 12 is provided with a longitudinal slot 25 into which a pin 26 protrudes from the lower section of the rod 15 by means of which the rod and body member are caused to be rotated together and at the same time permitted to be slid longitudinally one within the other.

In order to exclude as much dust and dirt, rain and so forth as possible, a cylindrical shell 27 is provided to surround the ring 21 and insulating block 19, said shell being attached to the insulating washer 22 and spaced thereby away from the ring 21. The upper end of the shell surrounds the sleeve 13 in sliding engagement therewith. Furthermore, a protecting cap 28 is provided upon the upper section of the rod 15 to overlie the upper end of the head 11, said cap being shown as spherical and flexible and attached to the rod by means of a collar 29 clamping a portion of the cap 28 between said collar 29 and the collar 17.

By the construction so far described, it will be understood that with the parts in normal position as shown in Fig. 3, the rod 15 is in its lower position at which time the hinge joint of the rod or knuckle member is within the body member and necessitates that both sections of the rod be in substantial alinement vertically. However, as the knob and rod with their attached parts are raised, the hinge joint 16 comes out of the body member at which time the upper section of the rod may tilt over, and the parts are so arranged and adapted that such tilting is limited to allow the upper section of the rod to swing no farther than perpendicular to its original position. This is obtained by limiting upward movement of the rod so that its hinge pin is spaced above the top of the head 11 only a distance equal to the radius of the rod. Preferably, the upper end of the head slopes inwardly toward the central recess for the rod so that by drawing the rod downward again the upper section is swung back to vertical or alined position.

In order to positively throw the upper section of the rod out of alinement with the lower section so that gravity will tilt it down, I have shown a wire leaf spring 30 arranged within a vertical groove 31 of the lower section and held by means of a screw 32 at its lower end. The upper end of said spring is adapted to bear against a lip 33 on the lower end of the upper section of the rod when the sections are in alinement, and press against said lip to obtain the desired tendency to swing the said section. Obviously, the section is adapted to swing only in one direction, and suitable indicating means such as the arrow 34 is attached to the upper section of the rod to show in which direction it will tilt. Thus, when the vehicle is to be turned in one direction, the knob is rotated which accordingly rotates the rod until the arrow points in the direction it is desired to have the rod tilt, and then the knob and rod and its attached parts are raised at which time the upper section of the rod tilts over as shown in Fig. 4.

Any suitable device may be employed upon the signal arm or upper section of the knuckle member 15, but as shown, I prefer a flag 35 comprising a staff 36 held in a socket 37 in the free end of the upper section of the rod 15 and carrying at its outer end a suitable pennant 38. An electric light 39 is arranged at the end of the staff 36, the staff itself preferably being of metal and forming one of the leads to the light and the other lead being a wire 40 upon which the pennant 38 may be strung if desired. The wire 40 runs direct to a battery or other source of electric energy, not shown, and the other wire from said source is attached to the ring 21 adjacent the rod. Obviously, when the knob is raised so that the signal arm is allowed to swing, the ring 21 makes electric contact with the sleeve 13 thereby completing the circuit and illuminating the light 39. After the indicated operation of the vehicle has been performed the knob is drawn down upon and slid to its lowest position which thereby swings the indicating arm into vertical position again and breaks the electrical connection so that the light is no longer lighted.

Although I have shown my improved signal attached to the windshield of an automobile, it will be readily appreciated that it may be supported otherwise, and may in fact be applied to any other uses than upon automobiles to which it may be found adapted.

Obviously detail modifications and changes may be made in manufacturing my improved signal without departing from the spirit and scope of the invention, and I do not wish to be understood as restricting myself except as required by the following claims when construed in the light of the prior art.

Having thus described the invention what I claim is—

1. In a signal, a knuckle member having longitudinally of itself an axis about which it may rotate, and comprising sections pivoted together so as to be longitudinally fast with respect to each other, one section adapted to tilt with respect to the other when desired, and means for rotating said member whereby the said tilting section may be tilted in the desired direction.

2. In a signal, a member having sections one of which is adapted to extend in alinement with the other or be tilted with respect thereto as desired, and means for rotating said members so that the tilting section may be tilted in different directions.

3. In a signal, a rotatable body member, a knuckle member with alined sections slidable therein and adapted to flex when slid in one direction and be swung back when slid in the other direction, means for rotating said body member by rotating the knuckle member, and a handle on the knuckle member for sliding and rotating it.

4. In a signal, a body member providing a slideway, a knuckle member in said slideway, and means for sliding said knuckle member so as to draw its joint into the slideway and hold the sections in alinement or project said joint and allow flexing of the knuckle member.

5. In a signal, a body member providing a slideway, a knuckle member in said slideway, means for sliding said knuckle member so as to project its joint from the slideway and allow flexing or draw said joint into the slideway and hold the sections in alinement, and means for automatically and positively swinging the outer section of the knuckle member when its joint is projected from the slideway.

6. In a signal, a body member providing a slideway, a knuckle member in said slideway, and means for sliding said knuckle member so as to draw its joint into the slideway and hold the sections in alinement or project said joint and allow the projected section to tilt, the weight of the tilted knuckle member section holding the joint projected when flexed.

7. In a signal, a body member providing a slideway, a knuckle member in said slideway, and means for sliding said knuckle member so as to draw its joint into the slideway and hold the sections in alinement or project said joint and allow the projected section to swing, the weight of the knuckle member holding its joint in the slideway when slid thereinto.

8. In a signal, a body member providing a slideway, a knuckle member adapted to lie with its joint in said slideway and its sections extending in alinement, and means for sliding said knuckle member with respect to the slideway to project its joint therefrom and allow one of the sections to tilt.

9. In a signal, a body member providing a slideway, a knuckle member in said slideway, and means for sliding said knuckle member so as to project its joint and allow the projected section to swing or to draw its joint into the slideway and hold the sections in alinement, said knuckle member and body member having a coöperating slot and pin to determine their mutual relation.

10. A vehicle signal comprising a transverse support, a body member depending through said support and adapted to be rotated therein, a knuckle member slidable in said body member providing an upper section adapted to tilt when raised, means for raising the said upper section, and means for indicating in which direction the section will tilt.

11. In a signal, a body member having a hollow body portion and a longitudinal slot, a sectional signal member both sections of which are slidable in said body portion, one section adapted to be slid out of said body portion and tilt with respect thereto, and a pin adapted to project into said slot whereby the signal member may be slid without rotating with respect to the body portion.

12. In a signal, a body member having a hollow body portion, a sectional signal member both sections of which are slidable in said body portion, one section adapted to be slid out of said body portion and tilt with respect thereto, and a spring adapted to tilt said section when out of the body portion.

13. In a signal, a support, means for attaching said support in upright position to a vehicle, a knuckle member slidable longitudinally in said support and having a section adapted to be slid out of the top of said support, and a spring for actuating the upper section out of alinement with the other section, whereby it will tilt over by gravity when slid out of said support.

HENRY ROHRDANTZ.